(12) United States Patent
Geissler

(10) Patent No.: US 11,167,627 B2
(45) Date of Patent: Nov. 9, 2021

(54) COVERING ASSEMBLY FOR A MOTOR VEHICLE

(71) Applicant: Bayerische Motoren Werke Aktiengesellschaft, Munich (DE)

(72) Inventor: Andreas Geissler, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 32 days.

(21) Appl. No.: 16/712,468

(22) Filed: Dec. 12, 2019

(65) Prior Publication Data

US 2020/0114745 A1 Apr. 16, 2020

Related U.S. Application Data

(63) Continuation of application No. PCT/EP2018/070456, filed on Jul. 27, 2018.

(30) Foreign Application Priority Data

Aug. 17, 2017 (DE) ..................... 10 2017 214 376.2

(51) Int. Cl.
| | | |
|---|---|---|
| *B60J 7/20* | (2006.01) | |
| *B60J 7/12* | (2006.01) | |
| *B60J 10/90* | (2016.01) | |
| *B60R 13/02* | (2006.01) | |

(52) U.S. Cl.
CPC .............. *B60J 7/1247* (2013.01); *B60J 10/90* (2016.02); *B60R 13/0212* (2013.01)

(58) Field of Classification Search
CPC ... B60J 7/1247; B60J 7/202; B60J 7/20; B60J 7/205; B60J 10/90

USPC ......................................... 296/107.08, 4, 12
See application file for complete search history.

(56) References Cited

U.S. PATENT DOCUMENTS

| | | | | |
|---|---|---|---|---|
| 2,747,928 A | * | 5/1956 | Olivier | ..................... B60J 7/202 |
| | | | | 296/107.08 |
| 4,873,045 A | * | 10/1989 | Fujita | .................... B29C 31/044 |
| | | | | 264/259 |
| 5,295,722 A | | 3/1994 | Bonne et al. | |
| 5,738,402 A | | 4/1998 | Aydt et al. | |
| 2003/0030188 A1 | * | 2/2003 | Spengler | ................. B29C 43/36 |
| | | | | 264/458 |

(Continued)

FOREIGN PATENT DOCUMENTS

| | | |
|---|---|---|
| DE | 41 20 474 C1 | 10/1992 |
| DE | 41 36 895 C1 | 11/1992 |

(Continued)

OTHER PUBLICATIONS

International Search Report (PCT/ISA/210) issued in PCT Application No. PCT/EP2018/070456 dated Oct. 23, 2018 with English translation (four (4) pages).

*Primary Examiner* — Dennis H Pedder
(74) *Attorney, Agent, or Firm* — Crowell & Moring LLP

(57) ABSTRACT

A covering assembly for a motor vehicle has a cover and a cover compartment lid for closing a cover compartment. The cover has a tensioning hoop which is pretensioned in the direction of the cover compartment lid in the closed state of the cover. A tensioning hoop seal is arranged on the cover in the region of the tensioning hoop in order to seal a gap between the cover and the cover compartment lid. A sealing surface is formed directly by the surface of the cover compartment lid.

10 Claims, 1 Drawing Sheet

(56) References Cited

U.S. PATENT DOCUMENTS

2010/0264685 A1\* 10/2010 Neubrand ................ B60J 7/202
296/107.08

FOREIGN PATENT DOCUMENTS

| DE | 44 41 669 C1 | 11/1995 |
|----|---|---|
| DE | 196 42 191 C2 | 7/2002 |
| DE | 10 2009 040 609 A1 | 3/2011 |
| DE | 10 2010 013 781 A1 | 10/2011 |
| DE | 10 2016 108 284 A1 | 8/2017 |
| EP | 1 695 855 A2 | 8/2006 |
| WO | WO 2008/113317 A2 | 9/2008 |

\* cited by examiner

COVERING ASSEMBLY FOR A MOTOR VEHICLE

CROSS REFERENCE TO RELATED APPLICATIONS

This application is a continuation of PCT International Application No. PCT/EP2018/070456, filed Jul. 27, 2018, which claims priority under 35 U.S.C. § 119 from German Patent Application No. 10 2017 214 376.2, filed Aug. 17, 2017, the entire disclosures of which are herein expressly incorporated by reference.

BACKGROUND AND SUMMARY OF THE INVENTION

The present invention relates to a covering assembly for a motor vehicle.

A known passenger motor vehicle of the convertible type has a tensioning hoop cover which can be transferred between an open position and a closed position. In the open position, the tensioning hoop cover is accommodated, in a folded-up state, in a cover compartment. The cover compartment can be closed by a cover compartment lid. The cover compartment lid consists of a body structure part and of a panel which forms what is referred to as a parcel shelf in an interior of the passenger motor vehicle and is mounted on the body structure part. The body structure part is of multishell design, that is to say with an outer shell and an inner shell, and imparts the required stability to the cover compartment lid. The outer-side transition region between the panel and the body structure part is covered by a mounted decorative strip. Upon closing the cover, the cover compartment lid is pivoted up and the cover is unfolded. The cover compartment lid is then closed, and a tensioning hoop which forms a rear lower edge of the cover is set down on the cover compartment lid. The decorative strip forms a sealing surface for a tensioning hoop seal which is fastened to the tensioning hoop of the cover. At the same time, the decorative strip forms an externally visible optical transition between a then visible part of the cover compartment lid and the cover. The part of the cover compartment lid that is visible from outside with the cover closed is the outer shell of the body structure part, which shell in turn forms part of a body outer skin of the passenger motor vehicle.

The dual function of the decorative strip as a sealing surface for the tensioning hoop seal and as an optical transition between the cover and the body outer skin requires that the decorative strip is configured to be sufficiently wide.

It is the object of the present invention to provide a covering assembly in which an arrangement of a tensioning hoop seal is simplified.

A covering assembly according to the invention for a motor vehicle has a cover and a cover compartment lid for closing a cover compartment. The cover has a tensioning hoop which is pretensioned in the direction of the cover compartment lid in the closed state of the cover. A tensioning hoop seal is arranged on the cover in the region of the tensioning hoop in order to seal a gap between the cover and the cover compartment lid. A sealing surface is formed directly by the surface of the cover compartment lid.

The tensioning hoop seal does not lie on a separately formed mounting element, in particular a decorative strip. That is to say that the sealing surface is not formed by an additional mounting element, but is formed directly on the surface of the cover compartment lid.

The surface of the cover compartment lid is preferably unpainted. The surface can furthermore be free of any other surface treatment.

This makes it possible to produce the sealing surface in a cost-effective or cost-neutral manner since it is an integral constituent part of the, in any case present, surface of the cover compartment lid. As already mentioned above, additional manufacturing steps, such as a surface treatment process or mounting of a mounting part, can be eliminated.

According to a preferred development of the invention, the surface of the cover compartment lid is a plastic surface. The plastic surface can be formed in particular from polyurethane.

What is meant by surface of the cover compartment lid is an outermost, integral layer of the cover compartment lid.

The plastic surface of the cover compartment lid preferably has a surface texture. Such a surface texture is known from surfaces of other interior parts of motor vehicles and imparts a high-grade appearance to the cover compartment lid. The surface texture is customarily formed by a correspondingly formed tool surface during production of the plastic surface.

The surface texture in the region of the sealing surface can advantageously have a smaller depth. The surface can also be formed in such a way that it is formed without surface texture in the region of the sealing surface.

The plastic surface is advantageously produced in a spray skin method or a forming method.

According to a preferred development of the covering assembly according to the invention, the cover compartment lid has a body outer skin portion and a vehicle interior portion. The sealing surface is formed on the vehicle interior portion.

The body outer skin portion and the vehicle interior portion can be parts which are produced separately from one another and which are connected to one another by a mounting operation. The vehicle interior portion, which can also be referred to as a panel or an interior panel, can be an element which is mounted on a basic body, in particular on a body structure part, of the cover compartment lid. The body outer shell portion can be a multishell body structure part with, for example, an outer shell and an inner shell. The body structure part can be formed in such a way that it imparts a required stability to the cover compartment lid. The body structure part can be formed from a metal material, for example steel or aluminum, or a plastic or a fiber-composite material, for example a fiber-reinforced plastic, or in a mixed type of construction.

A decorative strip is preferably arranged at the region, i.e. a transition region, between the body outer skin portion and the vehicle interior portion. The tensioning hoop seal advantageously bears against the surface of the vehicle interior portion directly adjacent to the decorative strip.

The decorative strip advantageously covers a transition between the body outer skin portion and the vehicle interior portion of the cover compartment lid. Furthermore, it forms an optical transition between the cover and the vehicle body.

The tensioning hoop seal preferably extends substantially over an entire length of the tensioning hoop.

This means that the seal can extend between a left, lower end adjoining a left, rear vehicle side window and a right, lower end adjoining a right, rear vehicle side window of the cover.

According to the invention, the sealing surface is preferably formed by an upwardly directed surface of the cover compartment lid. The sealing surface is in particular an outer, that is to say an outwardly directed, surface of the cover compartment lid. The sealing surface is for example an outwardly directed surface which, in the case of a completely opened cover, forms an outer surface of the motor vehicle. The upwardly directed surface of the cover compartment lid can also be referred to as an outer surface of the cover compartment lid.

The aforementioned developments of the invention may be combined with one another in any desired manner where expedient and possible.

Other objects, advantages and novel features of the present invention will become apparent from the following detailed description of one or more preferred embodiments when considered in conjunction with the accompanying drawings.

DETAILED DESCRIPTION OF THE DRAWINGS

There follows a detailed description of an exemplary embodiment with reference to the figures.

Figure 1:
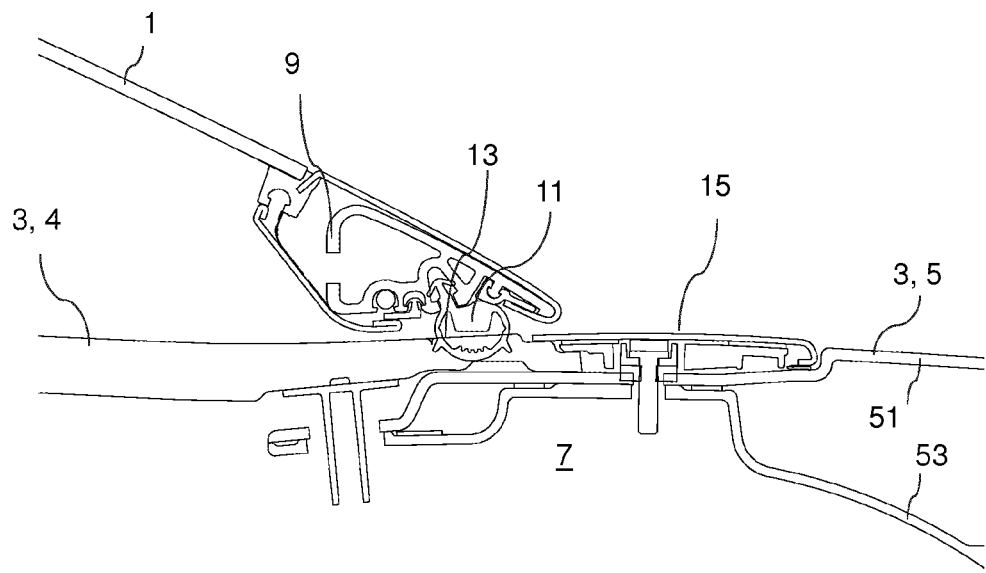
FIG. 1 is a schematic sectional view approximately along a line A-A of FIG. 2 through a covering assembly in the region of a tensioning hoop of a cover of a motor vehicle according to an exemplary embodiment of the present invention.

FIG. 1 shows a portion, which is to the rear in the direction of travel, of a covering assembly of a convertible motor vehicle or of a convertible passenger motor vehicle. The motor vehicle has a cover 1 which, in a folded-up and stowed state, can be accommodated in a cover compartment 7. FIG. 1 shows the closed state of the cover 1, in which the cover 1 is situated outside of the cover compartment 7. The cover compartment 7 is closed by a pivotable cover compartment lid 3. The cover compartment lid 3 consists substantially of two portions—a first portion which is situated substantially below or within the closed cover 1 and is referred to as a vehicle interior portion 4, and a second portion which is situated substantially outside of the closed cover 1 and is referred to as a body outer skin portion 5. The vehicle interior portion 4 could also be referred to as a panel or parcel shelf and has a plastic surface consisting of a polyurethane skin which is produced in a spray skin method or alternatively in a forming method. The vehicle interior portion 4 is of multilayer design, with the polyurethane skin forming an outer layer which is formed in connection with the other layers. The polyurethane skin has a surface texture which is designed to be similar to the surface of a dashboard or to the surface of other interior parts of the motor vehicle. The body outer skin portion 5 is a body structure part consisting of at least one outer shell 51, which is a constituent part of a body outer skin, and of one inner shell 53. The outer shell 51 and the inner shell 53 are connected to one another and impart a load-bearing function to the body outer skin portion 5 and substantially contribute to the stability or stiffness of the cover compartment lid 3.

The cover 1 has a tensioning hoop 9 which extends along a rear lower edge of the cover 1. In the closed state of the cover 1 that is shown, the tensioning hoop 9 is pretensioned in the direction of the cover compartment lid 3 by a kinematic cover mechanism. The tensioning hoop 9 has peripherally fastened thereto a tensioning hoop seal 11 which seals a gap between the cover 1, i.e. the tensioning hoop 9, and the cover compartment lid 3 in such a way that no water, dust particles or the like can enter from outside through the stated gap into the vehicle interior of the convertible motor vehicle. As on other vehicle flap elements, the tensioning hoop seal 11 is designed to be elastically deformable with a hollow profile in a known manner.

For the purpose of simplification, FIG. 1 shows the tensioning hoop seal 11 in a noncompressed position. In fact, with the cover 1 closed, the tensioning hoop seal 11 is in bearing contact with the cover compartment lid 3 and correspondingly compressed. In particular, the tensioning hoop seal 11 bears against a sealing surface 13 which is formed directly on the surface of the polyurethane skin of the vehicle interior portion 4 of the cover compartment lid 3. More precisely, the sealing surface 13 is formed by the surface of the polyurethane skin of the vehicle interior portion 4. Adjoining the sealing surface 13 there is formed a decorative strip 15 which is visible from outside and which covers a transition between the vehicle interior portion 4 and the body outer skin portion 5. The body outer skin portion 5, that is to say the outer shell 51, is a painted panel or plastic part which optically forms a constituent part of the outer skin of the body of the convertible motor vehicle. The body outer skin portion is customarily painted in the color of the surrounding body. The decorative strip can equally be painted in the color of the surrounding body or can be chrome-plated or be configured as a contrast in another color, for example black.

The tensioning hoop seal 11 does not lie on a surface of the decorative strip 15, that is to say, according to the exemplary embodiment of the invention, the decorative strip 15 does not form a sealing surface for the tensioning hoop seal 11. The decorative strip 15 can thus be configured with a smaller width, which, on the one hand, has aesthetic advantages, in particular when the cover 1 is opened, and, on the other hand, affords cost advantages since the decorative strip is produced from a smaller amount of material. The latter also has weight advantages. Furthermore, it is also possible to dispense with a corresponding surface treatment of the decorative strip 15 if the latter is not required as a sealing surface.

Figure 2:
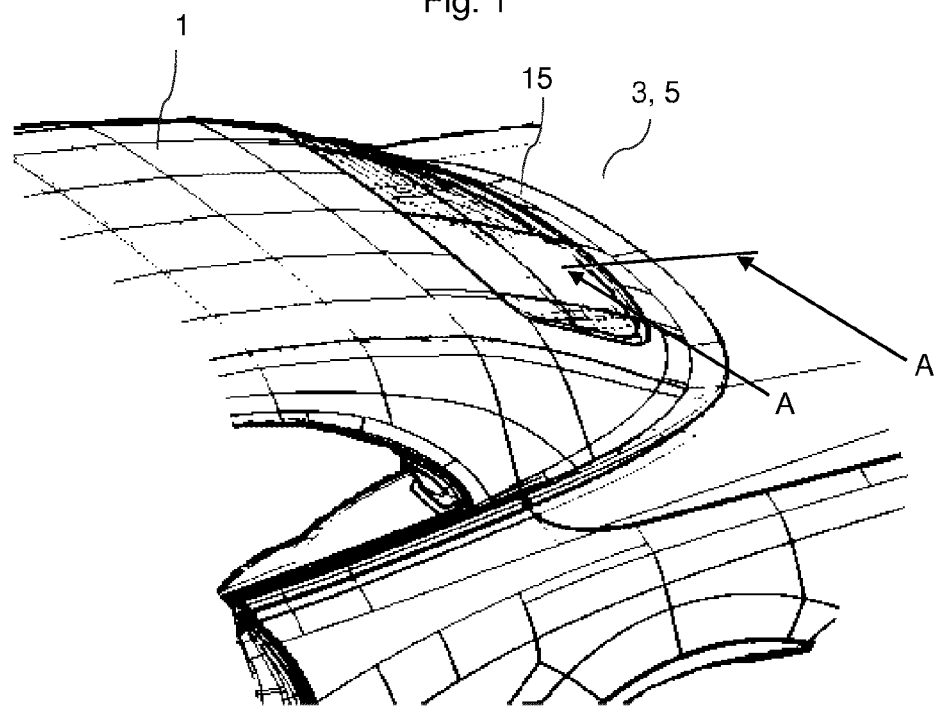
FIG. 2 is a schematic perspective view of a part of the motor vehicle with the covering assembly according to the exemplary embodiment of the present invention.

FIG. 2 shows a schematic perspective view of a part of the motor vehicle having the cover 1. The cover 1 is closed, and therefore the vehicle interior portion 4 of the cover compartment lid 3 that is situated below it cannot be seen. What is shown, however, is the decorative strip 15, which adjoins the lower end of the cover 1, that is to say the region of the tensioning hoop 9. Furthermore, a section line A-A of the sectional view of FIG. 1 is approximately illustrated in FIG. 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A covering assembly for a motor vehicle, comprising:
   a cover; and
   a cover compartment lid for closing a cover compartment, wherein
   the cover has a tensioning hoop which is pretensioned in a direction of the cover compartment lid in a closed state of the cover, a tensioning hoop seal is arranged on the cover in a region of the tensioning hoop in order to seal a gap between the cover and the cover compartment lid, and a sealing surface for the tensioning hoop seal is formed directly by a surface of the cover compartment lid, wherein the surface of the cover compartment lid is a plastic surface, the plastic surface has a surface texture, and the surface texture in the region of the sealing surface has one of a smaller depth than in non-sealing surface regions, or the region of the sealing surface is formed without the surface texture.

2. The covering assembly according to claim 1, wherein the surface of the cover compartment lid is unpainted and/or non-surface-treated.

3. The covering assembly according to claim 1, wherein the surface is a plastic surface made of polyurethane.

4. The covering assembly according to claim 1, wherein the surface texture of the surface in the region of the sealing surface has the smaller depth than in the non-sealing surface regions.

5. The covering assembly according to claim 1, wherein the plastic surface is a spray skin surface or a formed surface.

6. The covering assembly according to claim 1, wherein the cover compartment lid has a body outer skin portion and a vehicle interior portion relative to a closed position of the cover, and the sealing surface is formed on the vehicle interior portion.

7. The covering assembly according to claim 6, further comprising:

a decorative strip arranged at a transition region between the body outer skin portion and the vehicle interior portion, wherein the tensioning hoop seal bears against the surface of the vehicle interior portion directly adjacent to the decorative strip.

8. The covering assembly according to claim 1, wherein the tensioning hoop seal extends substantially over an entire length of the tensioning hoop.

9. The covering assembly according to claim 1, wherein the sealing surface is formed by an upwardly directed surface of the cover compartment lid.

10. A covering assembly for a motor vehicle, comprising:

a cover;

a cover compartment lid for closing a cover compartment, wherein the cover has a tensioning hoop which is pretensioned in a direction of the cover compartment lid in a closed state of the cover;

a tensioning hoop seal arranged on the cover in a region of the tensioning hoop in order to seal a gap between the cover and the cover compartment lid;

a sealing surface for the tensioning hoop seal formed directly by a surface of the cover compartment lid, wherein the cover compartment lid comprises a separate body outer skin portion and a separate vehicle interior portion, in the closed state of the cover, which are connected to one another, and the sealing surface is formed on the vehicle interior portion;

a decorative strip arranged at a transition region between the body outer skin portion and the vehicle interior portion, wherein the tensioning hoop seal bears against the surface of the vehicle interior portion directly adjacent to the decorative strip.

* * * * *